US006302090B1

(12) United States Patent
Yokoyama et al.

(10) Patent No.: US 6,302,090 B1
(45) Date of Patent: Oct. 16, 2001

(54) VALVE DEVICE AND VALVE CONTROL METHOD

(75) Inventors: Hisashi Yokoyama; Satoshi Kawamura; Sotsuo Miyoshi; Toshihiko Miyake, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/642,663

(22) Filed: Aug. 22, 2000

Related U.S. Application Data

(63) Continuation of application No. PCT/JP98/05971, filed on Dec. 25, 1998.

(51) Int. Cl.[7] .............................. F02M 25/07; H02P 8/00

(52) U.S. Cl. ................ 123/568.24; 318/696; 251/129.11

(58) Field of Search ....................... 123/568.24; 318/696, 318/685; 251/129.11

(56) References Cited

U.S. PATENT DOCUMENTS 5,501,201 * 3/1996 Miyoshi et al. ................ 123/568.24
5,503,131 * 4/1996 Ohuchi ............................ 123/568.24
5,579,743 * 12/1996 Kadowaki ....................... 123/568.24

FOREIGN PATENT DOCUMENTS 4-276166 10/1992 (JP) .
4-301170 10/1992 (JP) .
05168294-A * 7/1993 (JP) .
6-343296 12/1994 (JP) .
7-46891 2/1995 (JP) .
7-83122 3/1995 (JP) .
7-332168 12/1995 (JP) .
8-93573 4/1996 (JP) .
8-114158 5/1996 (JP) .
9-140192 5/1997 (JP) .
10-159592 6/1998 (JP) .

* cited by examiner

*Primary Examiner*—Henry C. Yuen
*Assistant Examiner*—Arnold Castro
(74) *Attorney, Agent, or Firm*—Sughrue, Mion, Zinn, Macpeak & Seas, PLLC

(57) ABSTRACT

When a valve lift control signal is received from a control unit 10, two coils from amongst the coils 18*a*–18*d* in a step motor 18 are excited and an aperture of a valve 14 is regulated. When the aperture regulation of the valve 14 is completed and a fixed period of time elapses, the excitation mode of the step motor 18 is switched from 2-phase to 1-phase.

10 Claims, 9 Drawing Sheets

FIG.5

2-PHASE EXCITATION PATTERN

| PHASE \ TRANSISTOR NUMBER | 22a | 22b | 22c | 22d |
|---|---|---|---|---|
| 0 | ON | OFF | OFF | ON |
| 1 | ON | OFF | ON | OFF |
| 2 | OFF | ON | ON | OFF |
| 3 | OFF | ON | OFF | ON |

FIG.6

1-PHASE AND 2-PHASE EXCITATION PATTERN

| PHASE \ TRANSISTOR NUMBER | 22a | 22b | 22c | 22d |
|---|---|---|---|---|
| 0 | ON | OFF | OFF | ON |
| 1 | ON | OFF | OFF | OFF |
| 2 | ON | OFF | ON | OFF |
| 3 | OFF | OFF | ON | OFF |
| 4 | OFF | ON | ON | OFF |
| 5 | OFF | ON | OFF | OFF |
| 6 | OFF | ON | OFF | ON |
| 7 | OFF | OFF | OFF | ON |

$T_1$ : DRIVE TIME
$T_2$ : POST-TERMINATION MAINTENANCE TIME } 2-PHASE EXCITATION
$T_3$ : 1-PHASE MAINTENANCE TIME 1-PHASE EXCITATION

VALVE DEVICE AND VALVE CONTROL METHOD

CROSS-REFERENCE TO THE RELATED APPLICATION

This Application is a continuation of International Application No. PCT/JP98/05971, whose International filing date is Dec. 25, 1998, the disclosures of which Application are incorporated by reference herein.

BACKGROUND OF THE INVENTION

1. Field of the Invention

The present invention relates to a valve device and valve control method. The valve is mounted in an engine system and reduces the concentration of exhaust gases by recirculating engine exhaust gases to the engine combustion chamber.

2. Description of the Related Art

FIG. 1 shows an engine system mounting a conventional Valve device. In the figure, reference numeral 1 denotes an air cleaner which removes particulate matter contained in external air and transfers such air to an air intake 3. 2 is an injector which injects fuel (for example gasoline) into the air intake 3. 3 is an air intake which supplies a gaseous mixture and fuel to the engine 5. 4 is a throttle valve which regulates the amount of the gaseous mixture supplied to the engine 5. 5 is an engine of an automobile which transmits drive force to the drive system by the combustion of the gaseous mixture. 5*a* is a combustion chamber of the engine 5, 5*b* is an intake valve closing the communication of the combustion chamber 5*a* with the air intake 3, 5*c* is an exhaust valve which closes the communication of the combustion chamber 5*a* and the exhaust outlet 6, 5*d* is a piston which displaces vertically in the combustion chamber 5*a*.

6 is an exhaust outlet which exhausts a gaseous mixture (exhaust gas) which has been combusted in the engine 5. 7 is a purification device which allows emission of exhaust gases to the atmosphere after their purification. 8 is a re-circulation pipe which circulates a part of the exhaust gases exhausted from the engine 5 to the engine combustion chamber 5*a*. 9 is an EGR valve which is disposed in the re-circulation pipe 8 and which is a valve device which regulates an re-circulated amount of exhaust gases. 10 is a control unit which controls the aperture of the EGR valve 9 in response to an operational state of the vehicle.

FIG. 2 is a cross sectional view of a conventional valve device (EGR valve). In the FIG., 11 is a housing of an EGR valve 9,12 is a through passage connected with the re-circulation pipe 8 on the exhaust outlet 6 side. 13 is a through passage connected with the re-circulation pipe 8 on the air intake 3 side. 14 is a valve disposed between the through passage 12 and the through passage 13. 14*a* is an abutting member which abuts with the valve 14. 15 is a valve rod which supports the valve 14. 16 is a spring support member, 17 is a spring which compresses the valve rod 15 upwardly. 18 is a step motor which displaces the drive rod 19 vertically when regulating the aperture of the valve 14. 19 is a drive rod which displaces a valve rod 15 upwardly together with the rotation of the step motor 18.

The operation of the invention will be described below.

When the engine 5 receives a gaseous mixture of fuel and air from the air intake 3, drive force is transmitted to the drive system by the reciprocal motion of the piston 5*d* by combustion of the gaseous mixture. Exhaust gases which result from the combustion of the gaseous mixture are output to the exhaust outlet 6 from the combustion chamber 5*a*.

The majority of the exhaust gases are emitted into the atmosphere after purification by the purification device 7. In order to reduce the concentration of the exhaust gases, a part of the exhaust gases is re-circulated to the combustion chamber 5*a* of the engine 5 through the re-circulation pipe 8.

The amount of re-circulation of exhaust gases re-circulated to the combustion chamber 5*a* of the engine 5 is regulated by the EGR valve 9 disposed in the re-circulation pipe 8 and depends on an operational condition of the vehicle.

Hereafter control of the re-circulated amount of exhaust gases by the EGR valve 9 will be described.

Firstly when the engine is stopped, the valve rod 15 and the drive rod 19 are in an opposed state. Although the valve rod 15 does not receive a downward depressing force from the drive rod 19, since an upward force is applied by the spring 17, the valve rod 15 abuts with the abutting member 14*a* and the re-circulation of the exhaust gases is stopped.

On the other hand, when the engine 5 is started in order to regulate an amount of engine exhaust gases balanced with the vehicle operational condition, the control unit 10 controls the aperture of the valve 14 in the EGR valve 9 by outputting a valve lift control signal (a valve signal which commands the opening or closing of the valve 14) to the EGR valve 9 based on the temperature of the engine coolant, the engine rotation speed, the injection pump aperture and the like.

For example, when the EGR valve 9 receives a pulse signal for opening the valve 14, the coil of the step motor 18 is excited and the step motor is rotated in a direction in which the drive rod 19 is depressed. In order for the step motor 18 to maintain a large drive torque, the excitation mode of the step motor 18 adopts a 2-phase excitation.

In this way, when the drive rod 19 is depressed and abuts with the valve rod 15, the valve rod 15 is depressed downwardly, the valve 14 of the EGR valve 9 is opened and the re-circulation of exhaust gases commences.

When the re-circulation amount of exhaust gases is balanced with the operational conditions of the vehicle, that is to say, when the aperture of the valve 14 equals a target value, a valve lift control signal (a pulse signal which commands the opening of the valve 14) received from the control unit 10 is terminated. When a pulse signal commanding the closure of the valve 14 is repeated, the aperture of the valve 14 approaches a target value and the rotation of the step motor is terminated.

The step motor 18 is required to maintain a fixed aperture in the valve 14 by resisting the pressing force of the spring 17 even when rotation is terminated (hereafter referred to as "not driven"). Thus the coils remain in an excited state (2-phase) with a continuous electricity supply (when the motor is driven, the supply of electricity is interrupted when receiving a pulse signal).

Since the conventional valve device is constructed as above, as the coils of the step motor 18 must be excited even when the step motor 18 is not driven and thus the excitation of the coils requires constant supply of electricity, the calorific value and electricity consumption of the coils is greater when the step motor is not driven than when the step motor is driven. Thus cost increases are incurred by the necessity to provide heat resistance with respect to high calorific values while the step motor is not driven. (In particular, when high-speed operation is required, the coil may be operated at low resistance and thus there is a tendency for temperature differentials between driven and non-driven periods to be great).

SUMMARY OF THE INVENTION

The present invention is proposed to solve the above problems and has the object of providing a valve device and valve control method which can suppress electricity consumption and calorific values in coils when a step motor is not driven.

The valve device of the present invention comprises an aperture regulation means which regulates an aperture of a valve by exciting a 2-phase motor which drives the valve on receiving a valve drive command and a switching means which switches a 2-phase excitation mode to 1-phase excitation when a fixed time elapses after the completion of aperture regulation by the aperture regulation means.

In this way, since it is possible to suppress calorific values and consumption of electricity in the coil when the step motor is not driven, it is possible to avoid cost increases due to restrictions imposed by heat resistance contingencies.

The valve control method of the present invention comprises the steps of regulating an aperture of a valve by exciting a 2-phase motor which drives the valve on receiving a valve drive command and switching the motor from 2-phase to 1-phase when a fixed time elapses after the completion of aperture regulation.

In this way, since it is possible to suppress calorific values and consumption of electricity in the coil when the step motor is not driven, it is possible to avoid cost increases due to restrictions imposed by heat resistance contingencies.

The valve control method of the present invention comprises the further step of setting a drive condition of the motor in response to a deviation with respect to a target value when a valve aperture is close to a target value.

In such a way, it is possible to coordinate the valve aperture quickly with the target value.

The valve control method of the present invention comprises the further step of giving a reverse rotation command to the motor after driving the motor is terminated, a reverse rotation pulse is given for the extremely short period of time in which the step motor 18 can not respond.

In such a way, it is possible to suppress an overshoot of the motor.

The valve control method of the present invention comprises the further step of comparing the load of the motor with a reference load and switching the drive mode of the motor from a 2-phase to a 1–2 phase when the motor load is smaller than a reference load.

In such a way, it is possible to take advantage of the merits of each drive mode by selecting a suitable drive mode.

The valve control method of the present invention comprises the further step of performing 2-phase excitation when driving the motor at a fixed speed and performing 1–2 phase excitation when accelerating the rotation of the motor.

In this way, it is possible to prevent undershoot and overshoot of the motor.

The valve control method of the present invention comprises the further step of providing a non-responsive region in the variation of the target value and not rotating the motor when the difference of the current target value and the following target value does not result in a variation of the target value.

In this way, the generation of abnormal friction can be avoided and the valve aperture can be accurately coordinated with a target value.

The valve control method of the present invention comprises the further step of reducing the rotation speed of the motor when the valve aperture is smaller than a target value in comparison to when the valve aperture is greater than a target value.

In such a way, it is possible to maintain motor operation and suppress rebound of the shaft generated when the value is completely closed even when the valve aperture is smaller than a target value.

The valve control method of the present invention comprises the further step of increasing the rotation speed of the motor when the valve is completely closed in comparison to when the valve is stopped when partially open.

In this way, it is possible to close the valve completely with loss of synchronism.

The valve control method of the present invention comprises the further step of initializing the aperture of the valve when cranking the engine.

In such a way, initializing noises when performing initialization are suppressed and it is possible to avoid the generation of initialization errors.

BRIEF DESCRIPTION OF THE DRAWINGS

FIG. 5 is a 2-phase excitation pattern.

FIG. 6 is a 1–2-phase excitation pattern.

DETAILED DESCRIPTION OF THE PREFERRED EMBODIMENTS

In order to describe the invention in greater detail, the preferred embodiments will be outlined below with reference to the accompanying figures.

Embodiment 1

Figure 3:
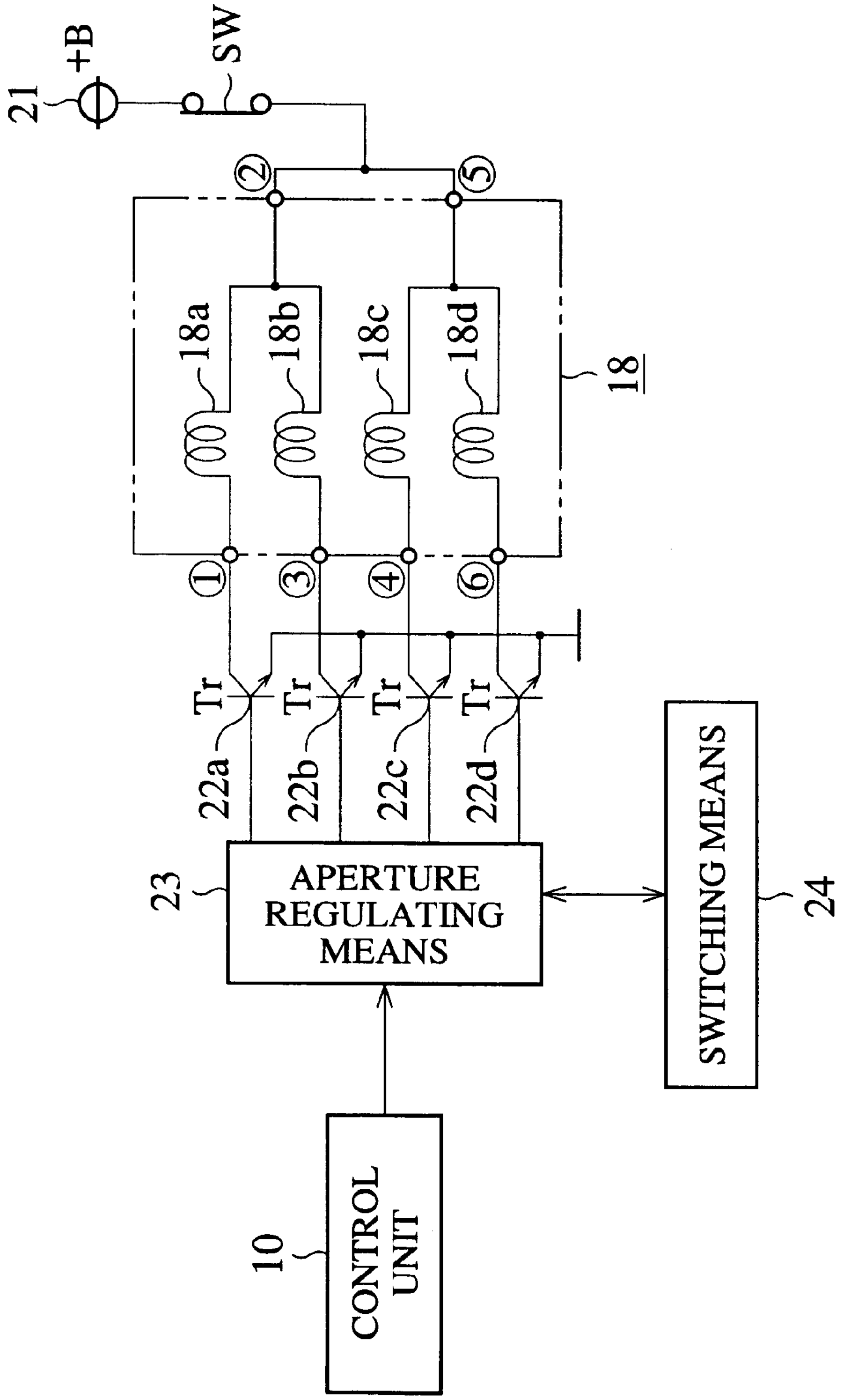
FIG. 3 shows a valve device according to a first embodiment of the present invention.

FIG. 3 shows a valve device according to a first embodiment of the present invention. In the figure, 10 is a control unit which controls an aperture of a valve 14 in an EGR valve 9 in response to an operational condition of the vehicle. 18 is a step motor which drives a drive rod 19 to displace vertically, 18$a$, 18$b$, 18$c$ and 18$d$ are coils of the step motor 18, 21 is a power source which excites the coils 18$a$–18$d$, 22$a$, 22$b$, 22$c$, 22$d$ are transistors, 23 is an aperture regulating means which regulates an aperture of a valve 14 by exciting two coils from among the coils 18$a$–18$d$ of the step motor 18 when receiving a valve lift control signal (a pulse command signal for opening or closing the valve 14) from the control unit 10. 24 is a switching means which switches the excitation mode of the step motor 18 from 2-phase to 1-phase after a fixed time has elapsed after completion of the aperture regulation by the aperture regulation means 23.

Figure 4:
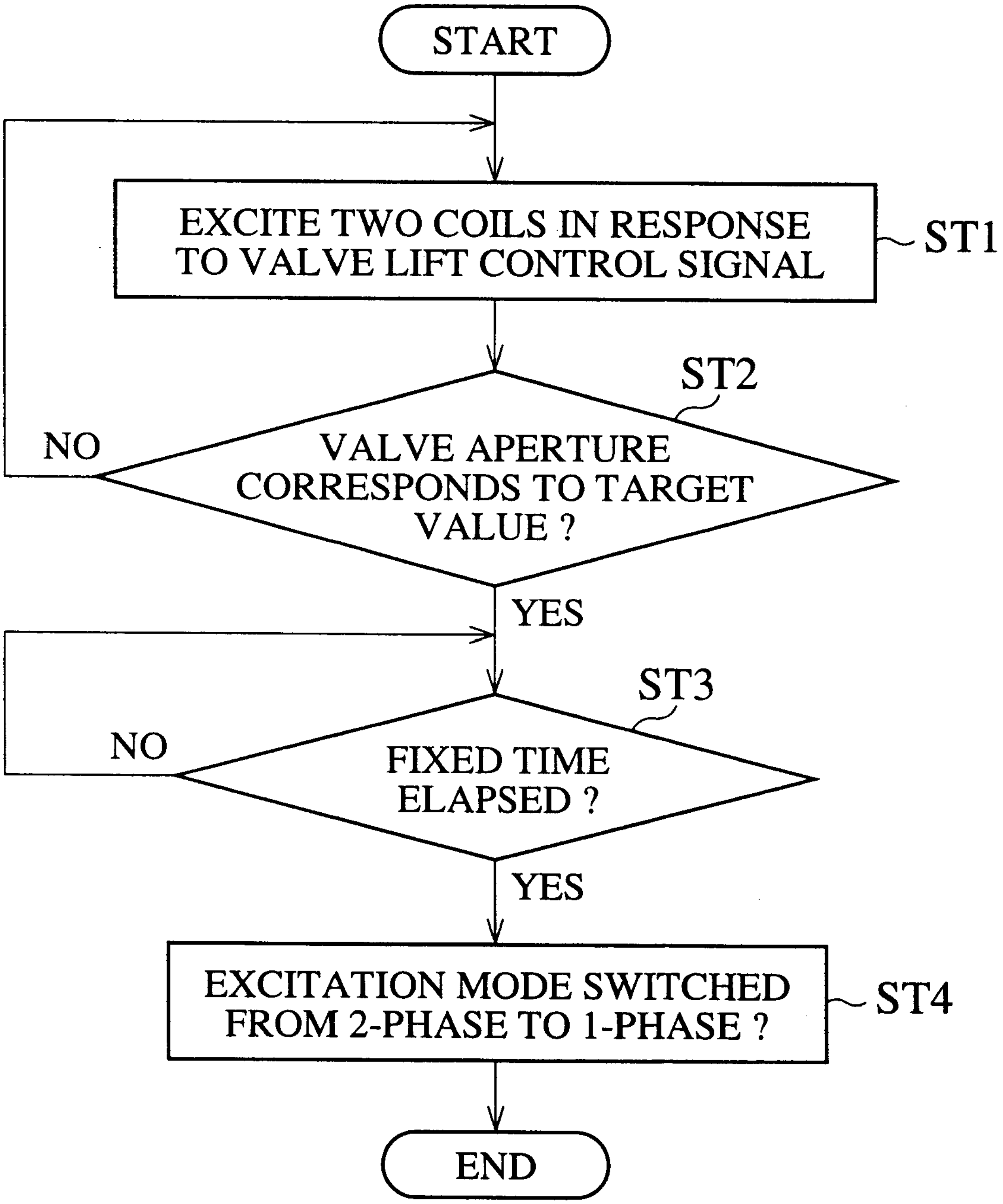
FIG. 4 is a flowchart of a method of controlling a valve according to a first embodiment of the present invention.

FIG. 4 is a flowchart of the valve control method according to a first embodiment of the present invention.

The operation of the invention will be described below.

Firstly when the engine 5 is stopped, as discussed above, the drive rod 19 and the valve rod 15 are opposed. Although the drive rod 19 does not apply a downward force on the valve rod 15, an upward force is applied by the spring 17. Thus the abutting section 14*a* is in a state of abutment and re-circulation of exhaust gases is prevented.

On the other hand, when the engine 5 is started, in order to recirculate an amount of engine exhaust gases balanced with the vehicle operational conditions, the control unit 10 controls the aperture of the valve 14 in the EGR valve 9 by outputting a valve lift control signal to the EGR valve 9 (a valve signal which commands the opening or closing of the valve 14) based on the temperature of the engine coolant, the engine rotation speed, the injection pump aperture and the like.

Precisely, the aperture regulation means 23 of the EGR valve 9 excites two coils from among the coils 18*a*–18*d* of the step motor 18 when receiving a valve lift control signal (a pulse command signal for opening or closing the valve 14) from the control unit 10. Thus the step motor 18 rotates in a direction in which the drive rod 19 is depressed downwardly. (step ST1)

That is to say, of the transistors 22*a*–22*d*, two transistors are placed in an ON position (the remaining transistors being placed in the OFF position) and two coils are excited (2-phase excitation pattern is shown in FIG. 5).

The reason that the aperture regulation means 23 adopts a 2-phase excitation mode is so that the step motor can maintain a large drive torque.

In such a way, the drive rod 19 is displaced downwardly and abuts with the valve rod 15. The valve rod 15 is depressed thus opening the valve 14 of the EGR valve 9 and exhaust gas re-circulation commences.

When the re-circulation amount of exhaust gases is in balance with the operational state of the vehicle, that is to say, when the valve aperture 14 corresponds with a target value (step ST2), a valve lift control signal (the command signal for opening the valve) received by the aperture regulation means 23 from the control unit 10 is terminated, the aperture of the valve 14 reaches a target value and the rotation of the step motor 18 is terminated.

The aperture regulation means 23 must maintain a fixed aperture for the valve 14 even when the step motor 18 is not driven. Thus although two coils are continuously excited, since supply of electrical power is continuous as described above when the step motor is not operated, the calorific value and electrical consumption of the coil is greater than when the step motor is driven.

Thus when a fixed time has elapsed after completion of the regulation of the valve aperture by the aperture regulation means 23 (step ST3), the switching means 24 executes a process of switching the excitation mode of the step motor 18 from 2-phase to 1-phase in order to suppress the calorific value and electricity consumption of the coil (step ST4).

In such a way, the aperture regulation means 23 maintains a fixed aperture of the valve 14 by exciting one of the coils 18*a*–18*d* of the step motor 18 (refer to FIG. 6 for a 1-phase excitation pattern).

After a fixed time has elapsed after the completion of the aperture regulation by the aperture regulation means 23, the reason for switching the excitation mode to a 1-phase excitation is as follows.

If the switch to 1-phase is made immediately before the completion of aperture regulation or immediately after termination of the step motor rotation, the holding power of the step motor 18 is reduced and overshoot increases. In a worst possible case, the possibility exists of the step motor 18 losing synchronism.

Figure 7:
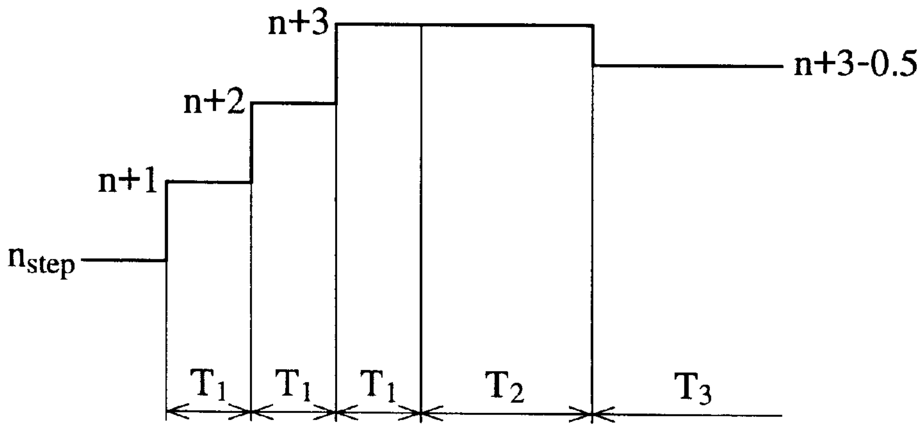
FIG. 7 is an explanatory figure showing the switching of the excitation mode.

As a result, the step motor 18 is not driven and 2-phase excitation which has a large holding force is performed until the behavior of the rotor has stabilized. When the behavior of the rotor has stabilized, the device is adapted to switch to a 1-phase excitation (refer to FIG. 7).

Figure 1:
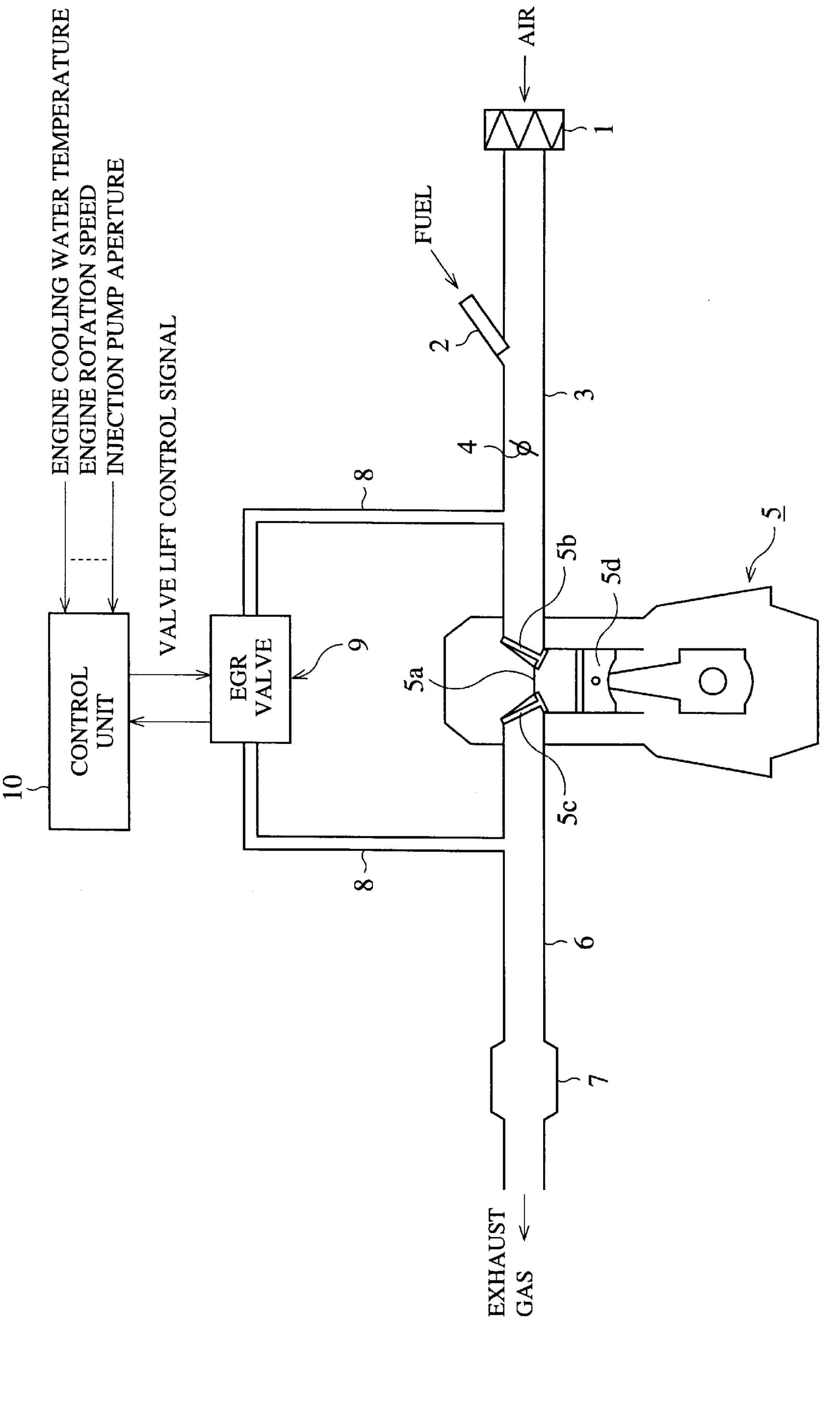
FIG.1 (PRIOR ART)
FIG. 1 shows an engine system mounting a conventional valve device.
Figure 2:
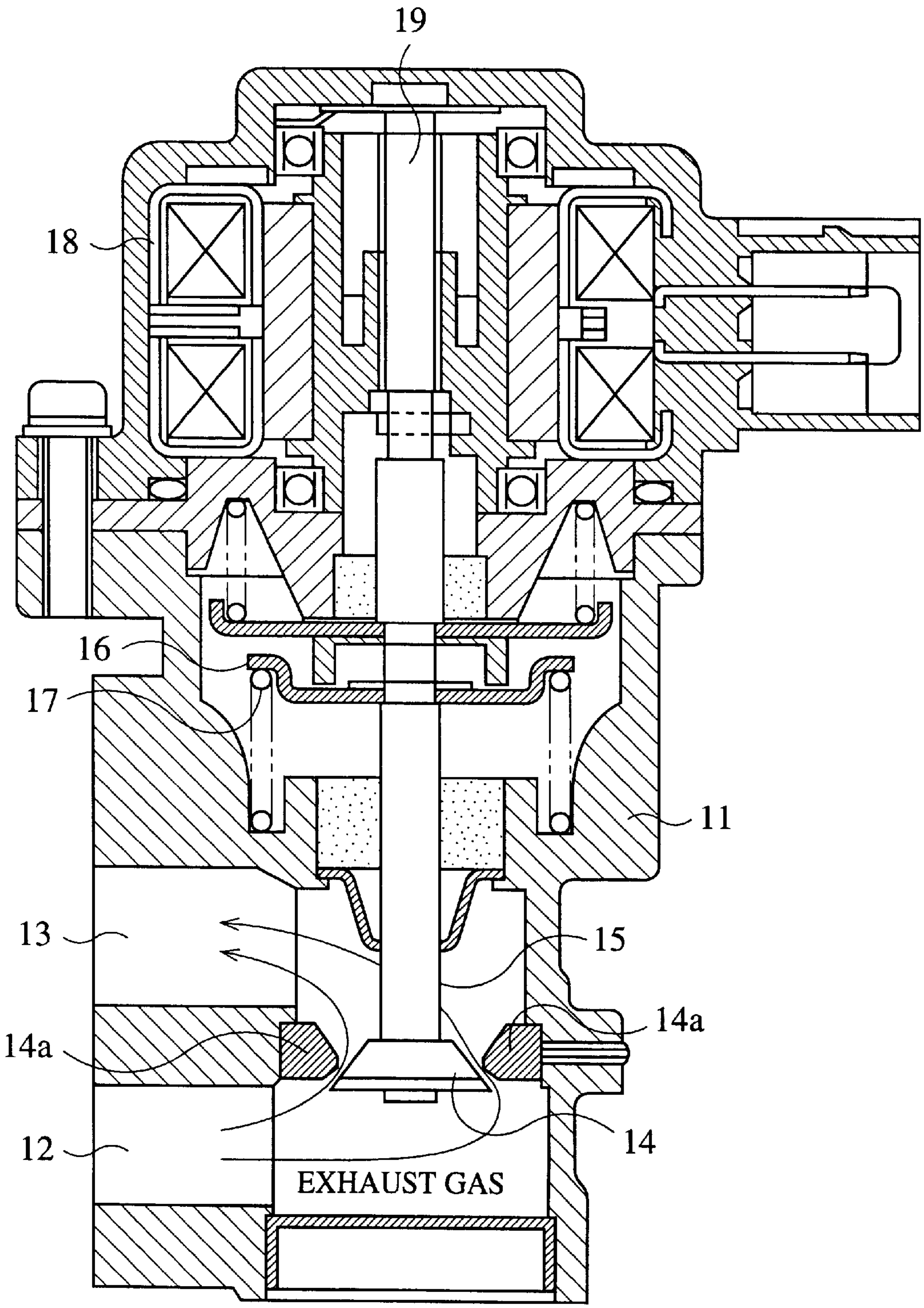
FIG.2 (PRIOR ART)
FIG. 2 is a cross sectional view showing a conventional valve device (EGR valve).

When the excitation mode is switched to 1-phase excitation, switching (the valve rod 15 is displaced upwardly) is performed to a 1-phase excitation which rotates through 0.5 step on the side with lower load (for a valve device which depresses the valve, (refer to FIG. 2) this is the side of valve closure which is the same direction as the load of the spring 17).

As shown above, according to embodiment 1, when a valve lift control signal is received from the control unit 10, two of the coils 18*a*–18*d* in the step motor 18 are excited and the aperture of the valve 14 is regulated. On the other hand, when aperture regulation of the valve 14 is completed and a fixed time has elapsed, the excitation mode of the step motor 18 is switched to 1-phase from 2-phase. Thus electricity consumption and the calorific value of the coil can be suppressed when the step motor is not driven and costs associated with provision for heat resistance can be reduced.

Embodiment 2

In embodiment 1 above, after aperture regulation of the valve 14 is completed and a fixed time has elapsed, the excitation mode of the step motor 18 is switched to 1-phase from 2-phase. However the drive condition of the step motor 18 may be set in response to a deviation of the current aperture of the valve 14 and a subsequent target value.

Figure 8:
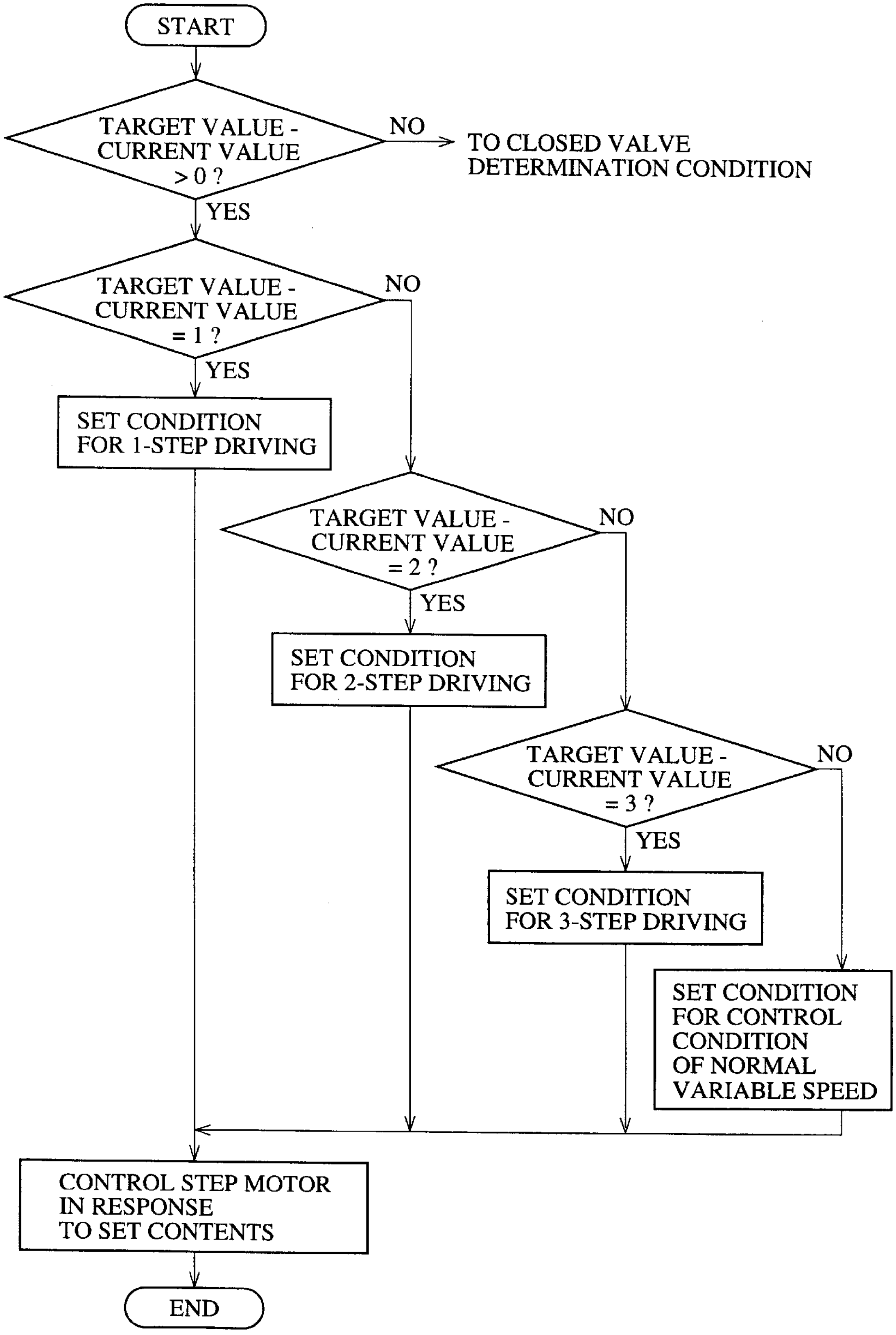
FIG. 8 is a flowchart showing the method of valve control according to embodiment 2 of the present invention.

That is to say, as shown in FIG. 8, an aperture of the valve 14 (current value) and a target value are compared and the deviation is determined to be 1 step of the step motor 18, 2 steps, 3 steps or 4 or more steps.

When the deviation of the aperture of the valve 14 and the target value is 4 steps or more, normal variable control is performed (for example, variable control is performed by varying a pulse width of the valve control signal). When the deviation of the current aperture of the valve 14 and the following target value is 3 steps or less, a drive condition of the step motor 18 is set on the basis of that deviation.

Since performing normal variable control is required at a deviation of 4 steps or more and normal variable control is not established at a deviation of 3 steps or less, loss of synchronism can result in a worst possible case. If the deviation is 3 steps, the optimal driving condition is set to 3-step control. If the deviation is 2 steps, the optimal driving condition is set to 2-step control. If the deviation is 1 step, the optimal driving condition is set to 1 step control. (For example, it is set to optimal pulse width and pulse number).

When 1 step control is executed, since it is not possible to completely vary the pulse width of the valve lift control signal, after executing 1 step control, a reverse rotation pulse is given for the extremely short period of time in which the step motor 18 can not respond. In such a way, it is possible to suppress overshoot of the step motor 18.

As explained above according to embodiment 2, a drive condition of a step motor 18 is set in response to a deviation of a current aperture of a valve 14 and a subsequent target value. Thus it is possible to correspond a valve aperture 14 quickly with a target value.

Embodiment 3

In embodiment 1 above, control was performed without particular reference to the load on a step motor 18. However when regulating the aperture of a valve 14, the load on a step motor 18 is compared with a reference load and when the load on the step motor 18 is lower than the reference load, the device is adapted to switch the drive mode of the step motor 18 from 2-phase to 1–2 phase.

That is to say, when the drive mode is 2 phase the step motor 18 can generate a large torque. However when the behavior of the rotor increases in value, the problem has arisen that overshoot increases when the step motor is stopped.

On the other hand, when the excitation mode is 1–2 phase, in comparison to 2 phase, the rotor behavior is reduced, overshoot is reduced and when the step motor 18 is not driven. However the problem arises that the torque of the step motor 18 is small.

Thus when the load on the step motor 18 is higher than a reference load, since a large torque is required, the step motor 18 is driven on a 2-phase excitation mode. When the load on the step motor 18 is smaller than a reference load, since stabilization of the rotor behavior is important, the step motor 18 is driven on a 1–2-phase excitation mode.

In this way, it is possible to take advantage of each driving mode by selecting an appropriate driving mode in response to a load on the step motor 18.

Embodiment 4

In embodiment 1 above, the excitation mode was switched from 2-phase to 1-phase after a fixed time had elapsed from the completion of aperture regulation of the valve 14. When the step motor 18 is rotated at a fixed speed, the step motor 18 is driven at 2-phase and when the step motor 18 is driven variably, the step motor 18 is driven at 1–2 phase.

As in embodiment 1 above, when the aperture of the valve 14 is regulated, normally the step motor 18 is driven in a 2-phase mode. Since overshoot or undershoot increases when the step motor is stopped, the probability of loss of synchronism increases when the period of the rotor corresponds to the period of the pulse width in the pulse lift control signal.

Thus in order to confirm the behavior of individual products, it is necessary to set a pulse time. If overshoot or undershoot is suppressed when the step motor is stopped, even if the period of the pulse width in the valve lift control signal corresponds with the period of the rotor, the probability of loss of synchronism does not increase. Therefore the degree of freedom with respect to setting conditions of the step motor 18 are increased.

Figure 9A:
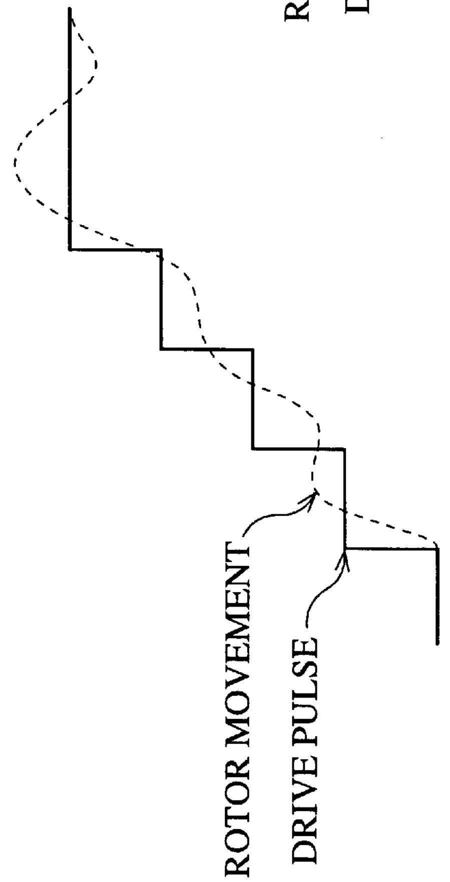
FIG. 9 shows the relationship between rotor period and the period of pulse width.
Figure 9B:
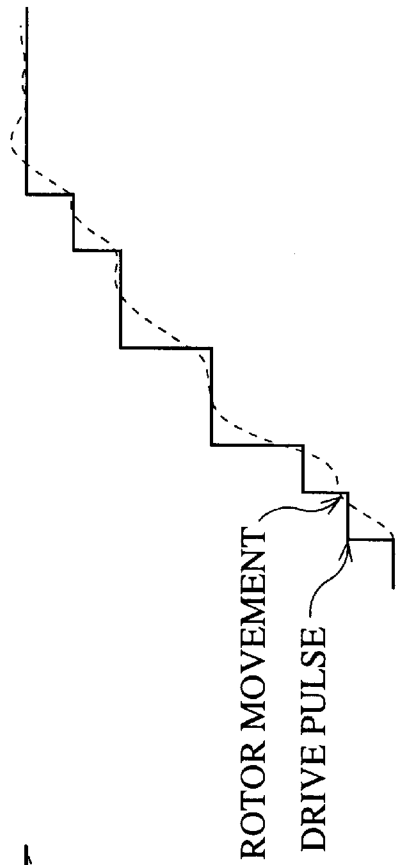

In embodiment 4, since overshoot or undershoot increases when the step motor is stopped, when the step motor 18 is driven at a fixed speed, 2-phase excitation of the step motor 18 is performed (refer to FIG. 9(*a*)). When the step motor 18 is accelerated, the step motor is driven by 1–2 phase excitation (refer to FIG. 9(*b*)).

Embodiment 5

Figure 10:
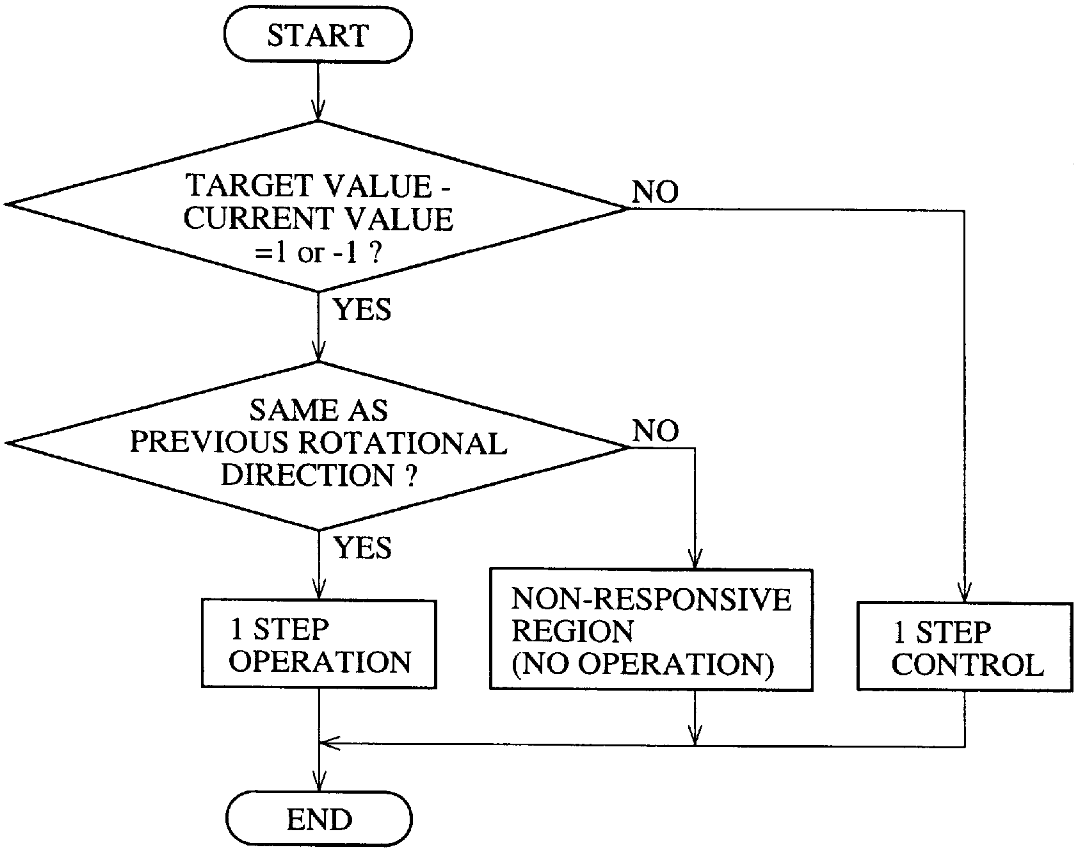
FIG. 10 is a flowchart of a valve control method according to embodiment 5 of the present invention.

In embodiment 1 above, the aperture of the valve 14 was regulated until the aperture of the valve 14 corresponded with a target value. However as shown in FIG. 10, a non-responsive region may be provided in the variation of the target value. Thus the step motor 18 is not driven on entering the non-responsive region in which the target value is not reset when a deviation between a current value and a subsequent value is small.

That is to say, a non-responsive region is provided in the variation of the target value in order to prevent "chattering" resulting from variations through small time periods of the target value of the aperture of the valve 14. However increasing the non-responsive region above a certain size impairs fine control and on the other hand if the non-responsive region is too small greater than normal friction will be generated.

Thus in this regard, embodiment 5 is adapted to correlate the aperture of the valve 14 accurately with the target value without increases in greater than normal friction. Thus when the rotational direction of the step motor 18 corresponds with the previous control period, the driving of the step motor is not suspended and can be controlled normally even if the subsequent target value of the aperture of the valve 14 is in the non-responsive region.

When the rotational direction of the step motor 18 does not correspond with the previous control period, rotation of the step motor 18 is not performed when the following target value of the aperture of the valve 14 enters a non-responsive region.

According to embodiment 5, it is possible to suppress the non-responsive region to a minimum of 1 step.

Embodiment 6

Figure 11:
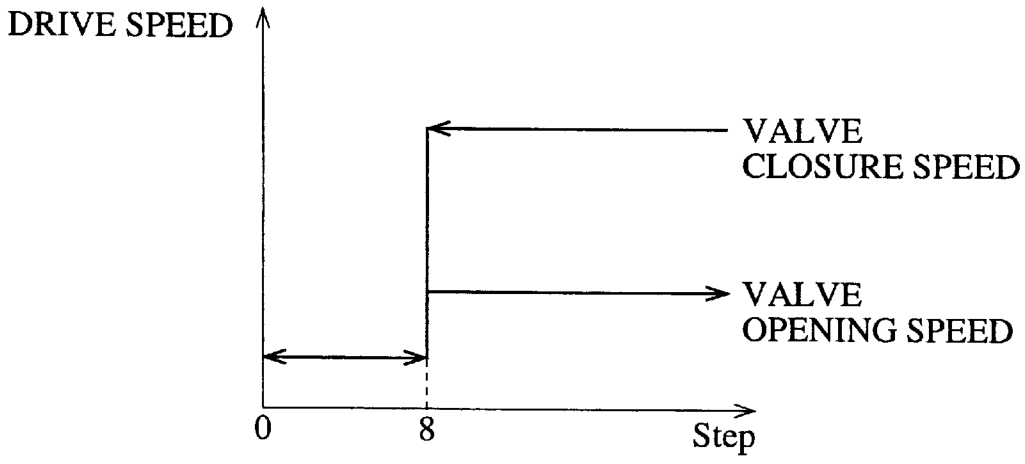
FIG. 11 is an explanatory view of the rotation speed of the step motor 18.

In embodiment 1, the rotational speed of the step motor 18 was not specified. However as shown in FIG. 11, when the aperture of the valve 14 is smaller than a reference aperture, in comparison with the case in which the aperture is larger than the reference aperture, the rotational speed of the step motor 18 may be reduced.

That is to say, when the aperture of the valve 14 is small or the valve is closed, the load on the step motor 18 is increased since a negative pressure is added to the valve 14.

On the other hand, when the negative pressure is reduced as the valve aperture increases, the load on the step motor is reduced.

Thus the speed of the step motor 18 when the valve is open must be determined in consideration of the large negative pressure added after valve opening is commenced.

When the valve 14 is opened from a state in which the aperture is smaller than a reference aperture, the step motor 18 is driven at a low speed in order to maintain a large torque. When the aperture of the valve 14 is greater than the reference aperture and the negative pressure reduces, the step motor 18 is driven at a high speed.

When the valve is closed from a state in which the value aperture is greater than a reference value, firstly the step motor 18 is driven at a high speed. When the valve aperture is smaller than the reference aperture and the negative pressure increases, the step motor 18 is driven at a low speed.

In such a way, it is possible to drive the step motor 18 accurately even when the aperture of the valve 14 is smaller than a reference aperture since it is possible to switch the torque depending on the load on the step motor 18. Thus even when the shaft abuts with the stopper of the rotor when the valve is completely closed, it is possible to suppress the rebound of the shaft.

Embodiment 7

In embodiment 1, the rotation speed of the step motor 18 was not particularly noted. However when the valve 14 is completely closed, the rotation speed of the step motor 18 may be increased in comparison with the case in which the valve 14 is stopped half-opened.

That is to say, when the rotation speed of the step motor 18 is increased, the overshoot when the motor is stopped increases and in the worst case loss of synchronism can result.

Thus when the valve 14 is stopped midway, the rotation of the step motor 18 is at a normal speed. However when it is necessary to completely close the valve rapidly, the step motor 18 is driven at a higher than normal speed.

In this way, when the valve 14 is completely closed, the shaft abuts with the stopper of the rotor, the rebound of the shaft increases and loss of synchronism may result. However in this case, any effect due to loss of synchronism is avoided as the step motor 18 is driven up to a minus step and thus low speed control is performed.

Embodiment 8

In embodiment 1, the timing of the initial setting of the aperture of the valve 14 was not particularly noted. However the initial setting of the aperture of the valve 14 may be performed when cranking the engine 5.

That is to say, when the engine 5 is stopped, the valve 14 is normally closed. However when the engine 5 is started, it is necessary to confirm accurately total closure of the valve 14 in order to accurately perform initial setting of the aperture of the valve 14.

Thus when starting the engine 5, an operational noise (hereafter initializing noise) is generated by the abutment of the shaft with the stopper of the rotor when closing the valve 14 totally.

However when the initializing setting is performed by the key being placed in the ON position, since the engine is not yet running and the surroundings are quiet, the initializing noise will be audible in the vehicle.

Thus in embodiment 8, in order to prevent the initializing noise from being audible when performing an initializing setting, the initializing setting of the aperture of the valve 14 is performed when cranking the engine 5.

When cranking the engine 5, noise in the engine space is loud and thus the initializing noise is difficult to hear.

Furthermore when the engine 5 is cranked, the torque of the step motor 18 is reduced because the voltage of the battery is reduced and thus the initializing noise is reduced.

Furthermore it is possible to suppress the generation of an initializing error by reducing the rebound of the shaft when totally closed by reducing the torque of the step motor 18.

As shown above, the valve device and valve control method of the present invention is mounted in an engine system which re-cycles exhaust gas of an engine to an engine combustion chamber and reduces the concentration of exhaust gas. Thus cost increases which accompany heat resistance requirements are reduced.

What is claimed is:

1. A valve device which controls a valve disposed in a re-circulation passage connecting an air intake which supplies a gaseous mixture to an engine and an exhaust outlet which exhausts engine exhaust gas wherein said valve device comprises:

an aperture regulation means which regulates an aperture of a valve by exciting a 2-phase motor driving said valve when receiving a valve drive command; and a switching means which switches an excitation mode of a motor from 2-phase to 1-phase when a fixed time period has elapsed after the completion of valve regulation by said aperture regulation means.

2. A valve control method comprising the step of controlling a valve disposed in a re-circulation passage connecting an air intake which supplies a gaseous mixture to an engine and an exhaust outlet which exhausts engine exhaust gas wherein said valve method comprises the further steps of:

regulating an aperture of a valve by exciting a 2-phase motor driving said valve when receiving a valve drive command; and switching an excitation mode of a motor from 2-phase to 1-phase when a fixed time period has elapsed after the completion of valve regulation by said aperture regulation means.

3. A valve control method according to claim 2, wherein a motor driving condition is set in response to a deviation of a current valve aperture and a subsequent target value.

4. A valve control method according to claim 2, wherein after driving the motor is terminated, a reverse rotation pulse is given to the motor for the extremely short period of time in which the motor can not respond.

5. A valve control method according to claim 2, wherein when a valve aperture is regulated, the excitation mode of said motor is switched from 2-phase to 1-phase when on comparison of the motor load with a reference load, the load on the motor is smaller than a reference load.

6. A valve control method according to claim 2, wherein when a valve aperture is regulated, said motor is driven at a 1–2 phase excitation when the motor is operated variably and is driven at a 2-phase excitation when the motor is driven at a fixed rotation speed.

7. A valve control method according to claim 2, wherein a non-responsive region is provided in the variation of said target value and when a deviation of a current target value and a subsequent target value is within said non-responsive region, said motor is not rotated only when the direction of the previous rotation and the subsequent rotation differ.

8. A valve control method according to claim 2, wherein a rotation speed of said motor is reduced when a valve aperture is smaller than a reference aperture in comparison to when it is larger than said reference aperture.

9. A valve control method according to claim 2, wherein when said valve is totally closed, the rotational speed of said motor is increased in comparison with when said valve is stopped midway.

10. A valve control method according to claim 2, wherein an initializing operation of said valve aperture is performed during cranking said engine.

* * * * *